POLYMERIZATION OF ETHYLENE WITH 3-METHYL-3-BUTEN-1-OL

The present invention relates to a process for the production of hydroxyl-containing ethylene copolymers which contain 0.5 to 8 parts by weight of polymerized units of an alkenol and, if desired, up to 50 parts by weight of other monoethylenically unsaturated monomers containing three to 15 carbon atoms which are copolymerizable with ethylene for each 100 parts by weight of polymerized units of ethylene, by polymerizing a mixture of ethylene, an alkenol and the other copolymerizable monomer(s), if any, at pressures of 800 to 4,000 atmospheres and temperatures of 100° to 320° C under the action of a free-radical polymerization initiator in the presence or absence of a polymerization regulator.

Methods of this type are well known; it is also well known that the products of the process have a number of desirable properties (cf. for example U.S. Pat. No. 3,313,789).

The prior art methods have the disadvantages that only a relatively small fraction of the amount of alkenol used is incorporated into the copolymer and that unreacted alkenol forms undesirable deposits, particularly in continuous copolymerization in which the monomers are recycled.

It is an object of the present invention to provide a process of the type specified above which does not have the disadvantages mentioned or has them to a far lesser extent.

We have found that the said object can be achieved by using 3-methyl-3-buten-1-ol as the alkenol.

The invention accordingly consists in a process for the production of hydroxyl-containing ethylene copolymers which contain (for each 100 parts by weight of polymerized units of ethylene) 0.5 to 8, particularly 1 to 5, parts by weight of an alkenol and, if desired, up to 50 parts by weight of another monoethylenically unsaturated monomer containing three to 15 carbon atoms which is copolymerizable with ethylene, by copolymerization of a mixture of ethylene, an alkenol and, if desired, another copolymerizable monomer at pressures of from 800 to 4,000 atmospheres and temperatures of from 100° to 320° C under the action of a free-radical polymerization initiator in the presence or absence of a polymerization regulator. The essential feature of the process according to this invention is that the alkenol used is 3-methyl-3-buten-1-ol.

The following may be said concerning the substances which are to be used according to the invention:

a. The ethylene should have the usual purity, i. e. should not contain more than 0.1 percent by weight of impurities;

b. 3-methyl-3-buten-1-ol is known as such; in the present case it acts in the copolymerization as a medium-strength polymerization regulator and has about the same effect as tetrahydrofuran which is also known as a polymerization regulator;

c. Conventional copolymerizable monomers (provided they fall within the above definition) are suitable as the other copolymerizable monomers. Vinyl esters of $C_1$ to $C_5$ alkanoic acids are particularly suitable. Esters of acrylic and methacrylic acid with $C_1$ to $C_8$ alkanols are also very suitable. The monomers in question may be used individually or as mixtures of different monomers.

d. Conventional free-radical polymerization initiators are suitable, for example oxygen or organic peroxides; they are used in the conventional amounts.

e. The optionally used polymerization regulators may also be conventional regulators, for example ketones, ethers or aldehydes. The amount of the polymerization regulators may also be that conventionally used but it should be borne in mind that 3-methyl-3-buten-1-ol also acts as a regulator to the extent already mentioned.

Conventional apparatus and methods used for the homopolymerization or copolymerization of ethylene under superatmospheric pressure and elevated temperature are suitable for carrying out the process according to this invention. Instead of giving further details, reference is made for example to "Ullmanns Enzyklopädic der technischen Chemie," volume 14, 3rd edition (Munich - Berlin 1963), chapter on "Polyäthylen," pages 137 to 148, and to Lyle F. Albright, "High-Pressure Processes for Polymerizing Ethylene," Chemical Engineering, volume 73 (1966), issue of 19th Dec. pages 113 to 120.

The products obtainable by the process according to the invention exhibit the same desirable properties as prior art products of the same class of substances.

The invention is illustrated by the following Examples, in which parts are by weight.

EXAMPLE 1

A tubular reactor is used such as is conventionally employed in the continuous high-pressure polymerization of ethylene. The ratio of the diameter of the reaction tube to its length is 1:16,000. The reaction tube is surrounded by a jacket for a heat-transfer medium. The jacket is subdivided into two separate zones, of which the first extends over 2/5 of the length of tube tube (zone (I)) and the second over the remaining 3/5 (zone (II)). A valve is provided at the end of the tube and this serves (a) to regulate the pressure in the polymerization chamber and (b) to discharge the reaction product. Downstream of this valve there is a conventional low-pressure separator for separating the resultant copolymer from substances which have not been polymerized, i. e. mainly from those portions of the monomers which have not been affected by the polymerization. The latter are recycled to the reactor itself through a conventional separator system for the separation of substances which are liquid at standard temperature and pressure. Such an amount of the recycle products is withdrawn as is necessary to maintain steady-state conditions in continuous operation of the reactor.

The reactor is fed on the inlet side with a mixture, compressed to 3,000 atmospheres, of 1. 100 parts per hour of ethylene;
2. 2.7 parts per hour of 3-methyl-3-buten-1-ol;
3. 0.033 part per hour of oxygen (as a free-radical-forming polymerization initiator);
4. 0.018 part per hour of propionaldehyde (as a polymerization regulator).

The heat-transfer medium in zone (I) of the reactor jacket is kept at a temperature of 170° C, and in zone (II) at 185° C. The reaction mixture thus achieves a maximum temperature of about 285° C as a result of the heat of reaction liberated. The residence time of the reaction mixture in the reactor is about one minute.

19.1 parts per hour of a copolymer is obtained which contains 2.5 parts of polymerized units of 3-methyl-3-buten-1-ol for each 100 parts of ethylene. 0.91 part per hour of pasty to liquid substances is obtained in the system for the separation of liquid substances.

COMPARATIVE EXPERIMENT

The procedure of Example 1 is followed except that instead of 2.7 parts per hour of 3-methyl-3-buten-1-ol an equal amount of 2-methyl-3-buten-2-ol is used.

19.7 parts per hour of a copolymer is obtained which contains 1.2 parts of polymerized units of 2-methyl-3-buten-2-ol for each 100 parts of ethylene. 2.2 parts per hour of pasty to liquid substances is obtained in the system for the separation of liquid substances.

EXAMPLE 2

The following are introduced under oxygen-free nitrogen into the 5-liter reaction zone of a stainless steel autoclave fitted with a magnetic stirrer:

1. 38 parts of 3-methyl-3-buten-1-ol;
2. 743 parts of vinyl acetate (as a comonomer); and 3. 0.80 part of ditertiary-butyl peroxide (as a free-radical polymerization initiator). Ethylene is then forced in until a pressure of 1,020 atmospheres has been reached and the autoclave is heated for 102 minutes at 136° C with the stirrer switched on. After the temperature of the contents of the autoclave has

United States Patent
Trieschmann et al.

[15] 3,664,988

[45] May 23, 1972

[54] POLYMERIZATION OF ETHYLENE WITH 3-METHYL-3-BUTEN-1-OL

[72] Inventors: Hans-Georg Trieschmann, Hambach; Helmut Pfannmueller, Limburgerhof; Hans Gropper, Ludwigshafen; Volker Gierth, Ludwigshafen; Gilbert Beck, Ludwigshafen, all of Germany

[73] Assignee: Badische Anilin-& Soda-Fabrik Aktiengesellschaft, Ludwigshafen (Rhine), Germany

[22] Filed: Dec. 5, 1969

[21] Appl. No.: 882,710

[30] Foreign Application Priority Data

Dec. 18, 1968 Germany .................. P 18 15 328.1

[52] U.S. Cl. .................. 260/80.75, 260/88.1 R
[51] Int. Cl. .................. C08f 15/00, C08f 15/40
[58] Field of Search .................. 260/80.75, 88.1 R

[56] References Cited

UNITED STATES PATENTS

| | | | |
|---|---|---|---|
| 3,313,789 | 4/1967 | Naapmann et al. | 260/80.5 |
| 3,471,459 | 10/1969 | Woples | 260/88.1 |

*Primary Examiner*—Joseph L. Schofer
*Assistant Examiner*—Stanford M. Levin
*Attorney*—Johnston, Root, O'Keeffe, Keil, Thompson & Shurtleff

[57] ABSTRACT

A process for the production of ethylene copolymers containing hydroxyl groups which contain polymerized units of ethylene, an alkenol and if desired other monomers copolymerizable with ethylene, by copolymerization of a mixture of ethylene, alkenol and the other copolymerizable monomer(s), if any, at superatmospheric pressure and elevated temperature under the action of a free-radical polymerization initiator in the presence or absence of a polymerization regulator. 3-methyl-3-buten-1-ol is used as the alkenol. The process has the advantage that it is more easily carried out than comparable prior art methods and that it gives copolymers containing a relatively high proportion of polymerized units of alkenol.

4 Claims, No Drawings